XR 3,831,604

United States Patent [19]
Neefe

[11] 3,831,604
[45] Aug. 27, 1974

[54] METHOD OF RESHAPING THE CORNEA

[76] Inventor: Charles W. Neefe, P.O. Box 429, Big Spring, Tex. 79720

[22] Filed: Sept. 19, 1973

[21] Appl. No.: 398,665

Related U.S. Application Data

[63] Continuation-in-part of Ser. No. 352,227, April 18, 1973, Pat. No. 2,776,230, which is a continuation-in-part of Ser. No. 241,904, April 7, 1972, which is a continuation-in-part of Ser. No. 45,333, June 11, 1970, which is a continuation-in-part of Ser. No. 562,002, May 16, 1966, abandoned.

[52] U.S. Cl................ 128/260, 351/162, 128/82.1
[51] Int. Cl............................................. A61m 7/00
[58] Field of Search ............ 128/260, 261, 90, 249, 128/82.1; 351/162

[56] References Cited
UNITED STATES PATENTS

| | | | |
|---|---|---|---|
| 2,241,415 | 5/1941 | Moulton | 351/162 |
| 3,364,340 | 10/1969 | Morgan | 128/249 |
| 3,680,548 | 8/1972 | Brown | 128/90 |
| 3,710,795 | 1/1973 | Higuchi | 128/260 |
| 3,710,796 | 1/1973 | Neefe | 128/260 |
| 3,776,230 | 12/1973 | Neefe | 128/260 |

Primary Examiner—Aldrich F. Medbery

[57] ABSTRACT

A method of correcting refractive errors of the eye by changing the shape of the cornea by softening the corneal tissue by the application of heat in the form of ultra sonic energy with and without the presence of chemical compounds to reshape the convex cornea to the curvature of the surface of a concave mold applied to the cornea.

10 Claims, 1 Drawing Figure

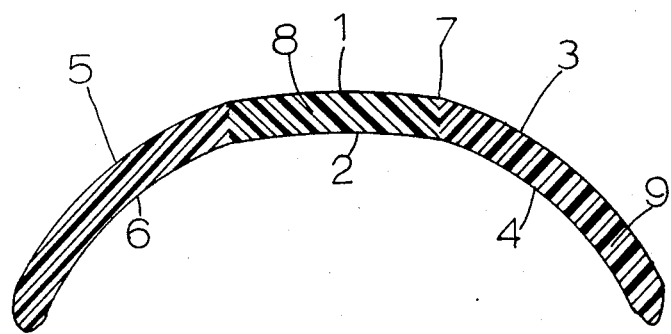

METHOD OF RESHAPING THE CORNEA

This is a continuation-in-part of application Ser. No. 352,227 entitled "A Method of Rapidly Reshaping the Cornea to Eliminate Refractive Errors" filed Apr. 18, 1973, now U.S. Pat. No. 2,776,230 which is a continuation-in-part of application Ser. No. 241,904 filed Apr. 7, 1972 entitled "Method of Reshaping the Cornea to Eliminate Refractive Errors," which is a continuation-in-part of application Ser. No. 45,333 filed June 11, 1970 entitled "A Dimensionally Stable Permeable Contact Lens" which is a continuation-in-part of the earlier application Ser. No. 562,002 filed May 16, 1966 now abandoned.

Refractive errors of the eye are corrected with spectacles by changing the angle at which the light enters the cornea by refracting the light with a lens before it reaches the cornea.

Contact lenses correct refractive errors of the eye by replacing the defective corneal curve with the front curve of the contact lens which is calculated to render the eye emmetropic. The FIGURE shows a mid-section view of the lens.

This new method corrects refractive errors by reshaping the cornea to the curvature required for emmetropia. This is accomplished by applying heat in several ways including ultra sonic energy and also chemical compounds which soften the cornea such as proparacaine hydrochloride, dyclonine hydrochloride, diethylominoacet-2, 6-xylidide hydrochloride, chloride, chlorine, or proteolytic enzymes to the cornea. The chemcial compounds may be supplied from the periphery of a contact lens to the lacrimal fluid by being dissolved from the lens or instilled by drops in the eye. The softened cornea is reshaped by being molded to the concave surface of a plastic mold having a predetermined curvature. The concave mold radius is selected to render the eye emmetropic and contact lenses or eye glasses will not be required for good visual acuity after removing the concave mold from the cornea.

The application of heat may be accomplished in several ways. The concave mold may be made of metal such as stainless steel, platinum, gold alloys or other inert metals. The metal mold may be heated in hot water, in an air oven, by microwave, infra-red, or other radiation sources and applied to the cornea at a temperature between 110°F and 160°F, radiation may be used to maintain the temperature with the mold on the cornea. The heated mold may be employed with or without chemical softening agents. The metabolic processes of the cornea are greatly accelerated at higher temperatures.

Ultra sonic mechanical energy having a frequency of 15,000 to 100,000 cycles per second also produces heat and rearrangement of the collagan fibrils of the stroma when applied to the cornea. The heating of the cornea and rearrangement of the collogan fibrils in the stroma under the influence of high frequency mechanical vibrations results in the cornea being reshaped. Two frequencies such as 16,000 and 90,000 cycles per second may be applied simultaneously and at independent and different energy levels.

It has long been known that the metabolic processes of the cornea increase with temperature as evidenced by the need of the cornea for additional oxygen as the corneal temperature is increased. This has been a problem encountered in fitting conventional hard contact lenses. Polymethyl methacrylate, used to make the lenses, is an excellent insulator of heat and the wearing of the lenses increases the temperature of the cornea by reducing the heat loss to the atmosphere and an increase in the demand for oxygen by the cornea follows, indicating an increase in the metabolic processes of the cornea with a slight increase in temperature, without the application of external heat.

The ground substance or cement between the collagan fibrils of the stroma is softened by the heat and energy of the ultra sonic vibrations and the fibrils may be rearranged in the stroma lamellae. This rearrangement is controlled by pressure applied to the cornea by the concave mold. The preferred methods employs the use of small amounts of selected chemical agents to soften and anaesthetize the cornea and the application of heat in the form of ultra sonic energy to a metal concave mold to rapidly establish the desired convex corneal curvature followed by the use of a contact lens having a concave curvature the same as the metal concave mold. The contact lens has a plano or no refractive power when on the eye since the convex surface of the cornea now has the curvature required for emmetropia. The contact lens may be worn as an optical bandage until all traces of the rearrangement have decayed.

The central curvature of the concave mold (2 FIG. 1) may be made aspheric with a longer radius towards the periphery as described in my earlier patents No. 3,510,207 and No. 3,641,717 describing the use of aspheric surfaces to correct the eye for spherical aberration. This added correction at the corneal surface will yield sharper images having better contrast than is possible with spherical surfaces. The reshaped cornea having an aspheric surface corrected for spherical aberration will have better optical quality than is possible in the natural eye.

The following are examples of some of the drugs which may be used to soften the cornea.

Proparacaine hydrochloride is an anesthetic and is known to soften the epithelial corneal tissues. The fact that it is an anesthetic is helpful in that the application of ultra sonic energy and curvature changing may take place without discomfort to the pateint.

Proteolytic enzymes soften the stroma and allow the corneal structure to assume the desired shape.

The corneal mold may be constructed of a gas permeable plastic material such as silicone carbonate co-polymer, cis-polybutadine, poly (4-methyl pentene), fluoroalkylethyl acrylates, or diacetone acrylamide co-polymers. The central segment (8 FIG. 1) may be transparent and has an inner curvature (2 FIG. 1) which is calculated to make the eye emmetropic when the cornea is molded to this curvature. The front curvature (1 FIG. 1) is of a radius such that a plano or zero refractive power is present in air. The peripheral segment (9 FIG. 1) has an inner radius (6 and 4 FIG. 1) equal to the periphery of the cornea to which it is applied. The convex surface of the periphery (5 and 3 FIG. 1) may be concentric to the concave surface. The gas permeability provides oxygen to the cornea and aids in removing carbon dioxide while the mold is in place thus greatly extending the time the lens may be comfortably worn.

Water absorbing hydrophilic materials may also be used to form the mold. The hydrophilic material must be firm and dimensionally stable. The lens periphery may be used to deliver the chemical agents to the cornea.

The central segment (8 fig. 1) may be transparent to allow vision while the mold is in place. The release rate of the chemical agents contained within the periphery of the lens (9 fig. 1) must be controlled.

The most effective and useful method of controlling release rate in contact lenses has been the use of a parsimonious particle containing the drug within the particle and the drug containing particles are dispursed within a matrix of drug transporting material. The parsimonious polymer has a low water content and may be as follows: methyl methacrylate 10 to 60 percent, ethyleneglycol monomethacrylate 20 to 60 percent, crosslinking agents such as allyl methacrylate and ethylene dimethacrylate may be used from 0.1 to 5 percent to slow the release rate further. An increase in the amount of methyl methacrylate also slows the release rate from the particle. Increasing the amount of ethyleneglycol monomethacrylate will increase the rate of drug release from the particle. An example of a drug transporting material follows: ethyleneglycol monomethacrylate cross-linked with 0.2 percent ethyleneglycol dimethacrylate when polymerized and hydrated water soluble drugs may migrate through the material.

The interocular pressure is 16 to 25 millimeters of mercury in the normal eye. This internal pressure forces the rearranged cornea against the inner surface of the concave mold and holds the corneal tissue in the desired shape. The mold is kept in place until the cornea has returned to its normal firm condition, the mold may be removed and the eye will remain emmetropic.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:

1. A method of making the eye emmetropic comprising, reshaping the cornea by the steps of providing a concave mold having a preselected central concave radius said concave radius being equal to the convex radius required on the cornea for the eye to be emmetropic and a peripheral curvature substantially equal to the peripheral corneal curvature, applying said concave mold to the cornea, providing heat in the form of ultra sonic energy having a vibration frequency between 15,000 and 100,000 cycles per second to the mold and the cornea to reshape the cornea to a convex curvature equal to the concave curvature present on the concave mold, the resulting curvature of the cornea being the curvature required to make the eye emmetropic.

2. A method as in claim 1 wherein the concave mold is made of metal.

3. A method as in claim 1 wherein selected nonpermanent cornea softening chemical compounds are applied to the cornea.

4. A method as in claim 1 wherein the said concave mold has a central transparent segment of a preselected concave radius.

5. A method as in claim 1 wherein the mold material is permeable to oxygen and carbon dioxide.

6. A method as in claim 1 wherein preselected nonpermanent cornea softening chemical compounds are applied within the peripheral segment of the concave mold and the release rate of said compounds from the mold to the eye is controlled.

7. A method as in claim 6 wherein the refractive power of the central transparent segment is plano or zero.

8. A method as in claim 1 wherein said central mold segment has an aspheric surface which when molded on the convex corneal surface will correct the eye for spherical aberration.

9. A method as in claim 1 wherein ultra sonic vibrations of two different frequencies are applied to the cornea.

10. A method as in claim 1 wherein ultra sonic vibrations of two different energy levels are applied to the cornea.

* * * * *